(12) United States Patent
Rocha

(10) Patent No.: US 11,224,173 B2
(45) Date of Patent: Jan. 18, 2022

(54) INTERNAL IRRIGATION CIRCUIT BOARD, PLANTABLE ROOF TILE COMPRISED OF AN INTERNAL IRRIGATION CIRCUIT BOARD AND A WALL PANEL COMPRISED OF AN INTERNAL IRRIGATION CIRCUIT BOARD

(71) Applicant: Sérgio Fausto Rizzi Rocha, Itu (BR)

(72) Inventor: Sérgio Fausto Rizzi Rocha, Itu (BR)

( * ) Notice: Subject to any disclaimer, the term of this patent is extended or adjusted under 35 U.S.C. 154(b) by 802 days.

(21) Appl. No.: 15/875,493

(22) Filed: Jan. 19, 2018

(65) Prior Publication Data

US 2019/0075739 A1  Mar. 14, 2019

(30) Foreign Application Priority Data

Sep. 12, 2017  (BR) .......................... 1020170194981

(51) Int. Cl.
| | |
|---|---|
| *E04B 7/18* | (2006.01) |
| *E04D 13/08* | (2006.01) |
| *A01G 25/02* | (2006.01) |
| *A01G 9/02* | (2018.01) |
| *A01G 9/033* | (2018.01) |
| *E04D 13/04* | (2006.01) |

(52) U.S. Cl.
CPC ........... *A01G 25/023* (2013.01); *A01G 9/025* (2013.01); *A01G 9/033* (2018.02); *E04B 7/18* (2013.01); *E04D 13/0409* (2013.01); *E04D 13/0445* (2013.01); *E04D 13/08* (2013.01); *E04D 2013/0813* (2013.01); *Y02P 60/20* (2015.11)

(58) Field of Classification Search
USPC ............ 47/48.5, 1.01 F, 1.01 T, 79, 65.9, 62
See application file for complete search history.

(56) References Cited

U.S. PATENT DOCUMENTS

| | | | |
|---|---|---|---|
| 6,996,932 B2 * | 2/2006 | Kruer ..................... | A01G 25/02 47/48.5 |
| 7,788,848 B1 | 9/2010 | Koumoudis | |
| 8,966,817 B2 * | 3/2015 | Cronk .................... | A01G 9/025 47/81 |
| 2002/0007591 A1 * | 1/2002 | Mischo .................. | A01G 9/033 47/65.9 |

(Continued)

FOREIGN PATENT DOCUMENTS

| | | | | |
|---|---|---|---|---|
| CN | 103362251 A | * | 10/2013 | ............... A01G 9/02 |
| DE | 102010045283 A1 | | 3/2012 | |

(Continued)

OTHER PUBLICATIONS

Search Report & Office Action for EP Application No. 17201869.9, dated Jun. 7, 2018.

*Primary Examiner* — Andrea M Valenti
(74) *Attorney, Agent, or Firm* — Pilloff Passino & Cosenza LLP; Sean A. Passino; Rachel K. Pilloff

(57) ABSTRACT

An internal irrigation circuit board (10) comprises: a body (1), with a planting niche (2) adjacent to a drip irrigation channel (3) holding at least one drip irrigation hose (5), with the drip irrigation channel (3) functioning in cooperation with the planting niche (2) through a connecting channel (4) arrayed concurrently with the drip irrigation channel (3), the connecting channel (4) conveying water accumulated in the drip irrigation channel (3) to the planting niche (2).

6 Claims, 3 Drawing Sheets

(56) References Cited

U.S. PATENT DOCUMENTS

2007/0033871 A1* 2/2007 Kelly ................... A01G 24/00
                                                    47/58.1 R
2011/0289839 A1   12/2011 Cronk et al.
2013/0167440 A1*  7/2013 Fischer ................ E04D 11/002
                                                    47/65.9

FOREIGN PATENT DOCUMENTS

| EP | 3181775 A1 | 6/2017 |
| JP | 2007097537 A | 4/2007 |
| WO | 2007050042 A1 | 5/2007 |
| WO | 2011095799 A1 | 8/2011 |

* cited by examiner

INTERNAL IRRIGATION CIRCUIT BOARD, PLANTABLE ROOF TILE COMPRISED OF AN INTERNAL IRRIGATION CIRCUIT BOARD AND A WALL PANEL COMPRISED OF AN INTERNAL IRRIGATION CIRCUIT BOARD

This invention refers to an internal irrigation circuit board, used particularly for growing plants on plantable roof tiles and wall panels in a manner that holds the planting substrate and provides localized water distribution for irrigating this substrate, and also refers to a plantable roof tile comprised of this internal irrigation circuit board and a wall panel comprised of this internal irrigation circuit board.

DESCRIPTION OF THE STATE OF THE ART

Assorted means and devices are being developed and used to ensure temperature stability for internal environments in a sustainable manner, in order to save electricity.

Among these means are green roof tiles, formed by the subsequent provision of layers in which draining elements, particle filters, substrates and planted seedlings are arrayed, which might or might not (depending on the type of plant grown) contain a supplementary irrigation system. The purpose of these roof tiles is to absorb external heat, preventing temperature increases inside the building and consequently saving electricity that would be used to cool these indoor rooms. In addition to providing temperature stability, green roof tiles absorb rainwater (reducing inundation and flooding), improving general air quality, providing heat insulation and offering space to grow food, in addition to aesthetic benefits and higher property prices.

In this sense, documents JP2007097537 and WO 2011095799 describe ways of attaching structures to regular roof tiles that can hold planting substrates that must be watered or have their own specific water storage region, respectively. However, the state of the art for green roof tile systems indicates that all assemblies require a leakproof base for the installation.

The recipients in which the substrates are arrayed and the seedings are planted in order to grow and form green roof tiles have also been subject to constant alterations and upgrades, such as document BR 10 2012 011176.4 for example, which describes the plantable roof tile and its assembly. This plantable roof tile is comprised of a sandwich-type structure holding a leakproof system integrated to the system of cultivation of green roofs, for the first time allowing the assembly of green roof tiles which contemplates the basic characteristic of any coverage: watertightness—this innovation makes unnecessary the need for a waterproof base, allowing the replacement of conventional roof tiles by the construction of a green roof.

Document BR 13 2015 032237.1 refers to an improvement to the plantable roof tile addressed in document BR 10 2012 011176.4. In this improvement, the plantable roof tile also comprises a sandwich-type structure, but containing an irrigation system with localized water distribution and a condensation process, enhancing plant growth even during droughts or dry seasons and reducing water consumption.

Although document BR 13 2015 032237.1 presents an improvement to the plantable roof tile irrigation system upgrade, the irrigation pipe in this plantable roof tile is placed directly over the substrate in the tile core, requiring that this irrigation pipe be supplied with the plantable roof tile, already assembled on the plantable roof tile, thus hampering its installation. Consequently, further development is required for plantable roof tile irrigation pipes.

Objectives of the Invention

Thus, the present invention has the object of providing an irrigation circuit board, internal to the plantable tile or wall panel, for collecting the water applied through drip hoses commonly found on the market and having them run through (irrigation circuit) to accurately distribute the volume and maintain the substrate properly irrigated regardless of the type of pipe or hose to be used for dripping, avoiding direct contact of this tube or hose with the substrate for greater ease of installation and maintenance.

Another objective of this invention is to provide an internal irrigation circuit board as the core of a plantable roof tile or a plantable wall panel, in order to hold the substrate and ensure its irrigation.

Another objective of this invention is to provide a plantable roof tile comprising an internal irrigation circuit board as a core for holding the substrate and providing irrigation for such substrate.

Another objective of this invention is to provide a wall panel comprising am internal irrigation circuit board as a core for holding the substrate and providing irrigation for such substrate.

BRIEF DESCRIPTION OF THE INVENTION

The subject of this invention is an internal irrigation circuit board comprising: a body with a planting niche alongside a drip irrigation channel holding at least one drip irrigation hose, with the drip irrigation channel being cooperate with the planting niche through a connecting channel arrayed concurrently with the drip irrigation channel, with the said connecting channel conveying water accumulated in the drip irrigation channel to the planting niche by gravity.

Another object of this invention is a plantable roof tile comprising a base roof tile and a perforated roof tile cap covering the base in a manner that forms a space to be filled by a core holding a plurality of plant seedlings, inserted into the system through the holes of the roof tile cap, the core consisting of an internal irrigation circuit board formed by a solid body with a planting niche alongside a drip irrigation channel holding at least one drip irrigation hose, with the drip irrigation channel being cooperate with the planting niche through a connecting channel arrayed concurrently with the drip irrigation channel, said connecting channel conveying water accumulated in the drip irrigation channel to the planting niche by gravity.

Another object of this invention is a wall panel comprising the panel base and a perforated panel cap covering the base in a manner that forms a space to be filled by a core holding a plurality of plant seedlings, inserted into the system through the holes of the panel cap, the core consisting of an internal irrigation circuit board formed by a body with a planting niche alongside a drip irrigation channel holding at least one drip irrigation hose, the drip irrigation channel being cooperate with the planting niche through a connecting channel arrayed concurrently with the drip irrigation channel, said connecting channel conveying water accumulated in the drip irrigation channel to the planting niche by gravity.

BRIEF DESCRIPTION OF THE DRAWINGS

This invention will be described in greater detail below, based on an example of an installation presented in the Drawings. The Figures show.

DETAILED DESCRIPTION OF THE INVENTION

Figure 1A:
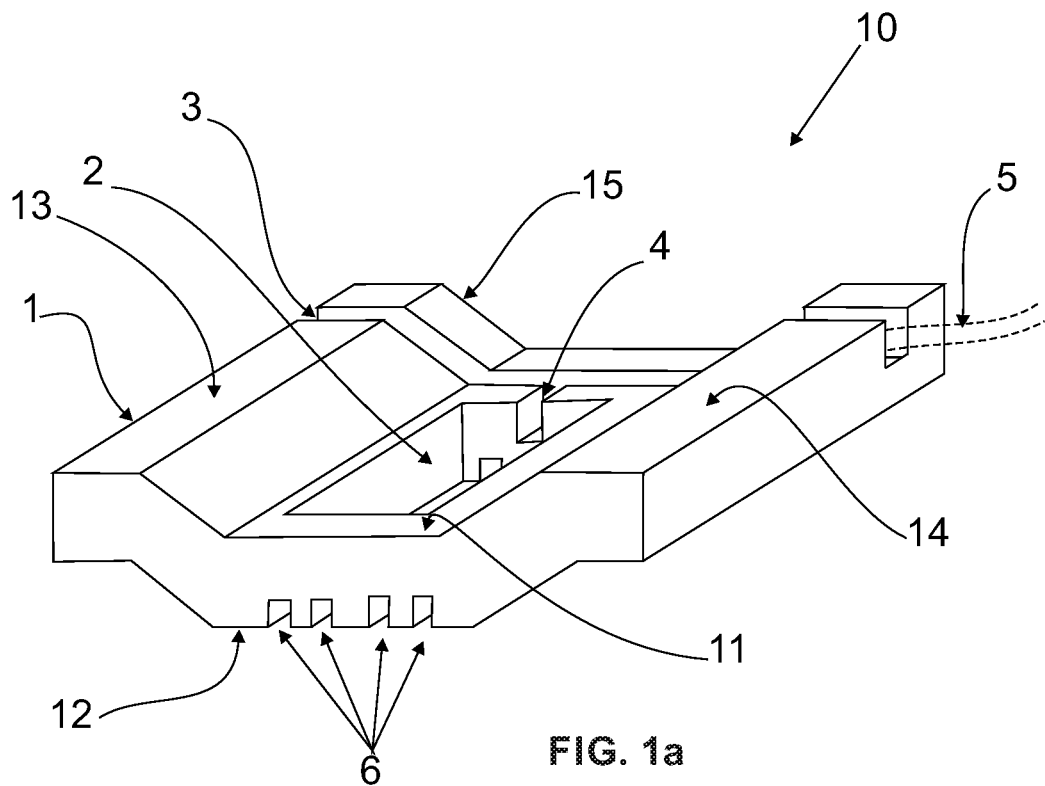
FIGS. 1a and 1b are schematic views in perspective of the internal irrigation circuit board object of this invention.
Figure 1B:
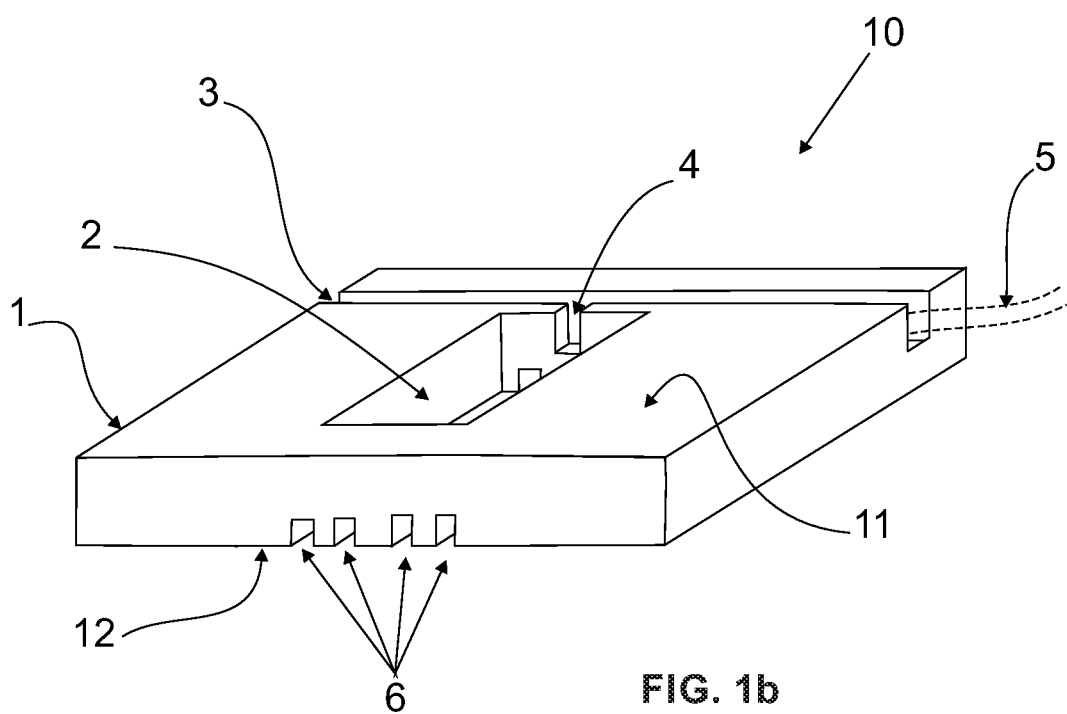
Figure 2:
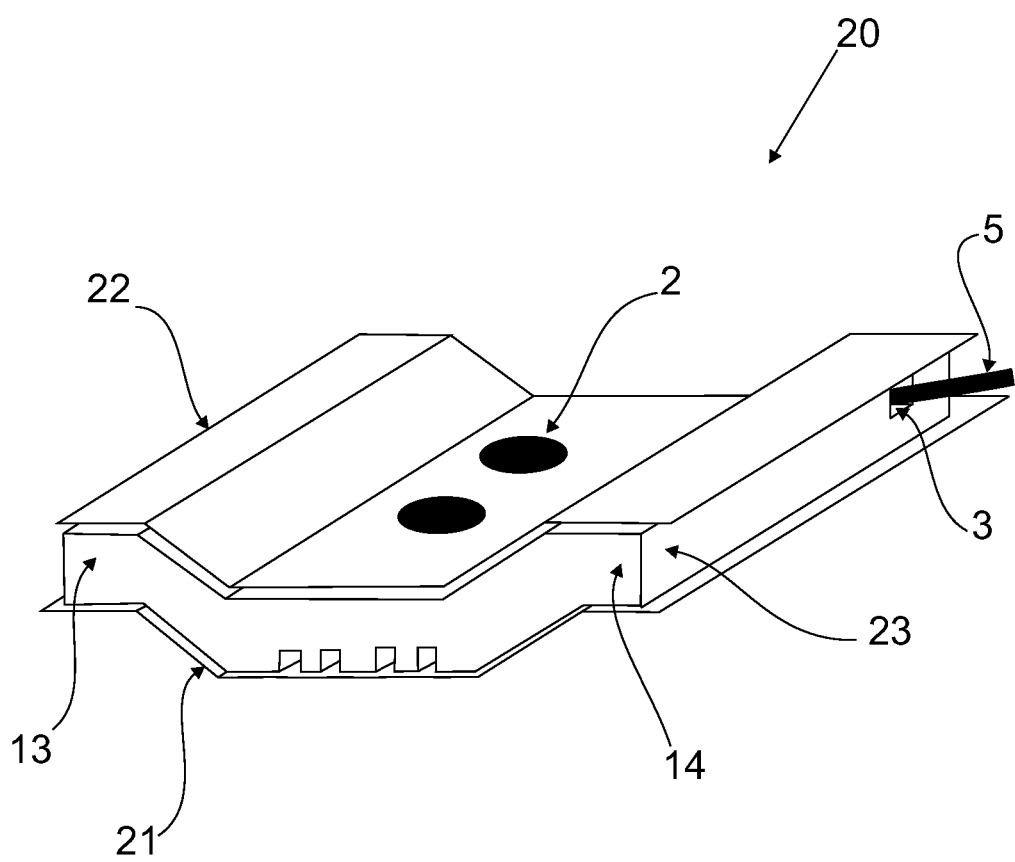
FIG. 2 is a schematic view in perspective of the internal irrigation circuit board arrayed in a plantable roof tile object of this invention.
Figure 3:
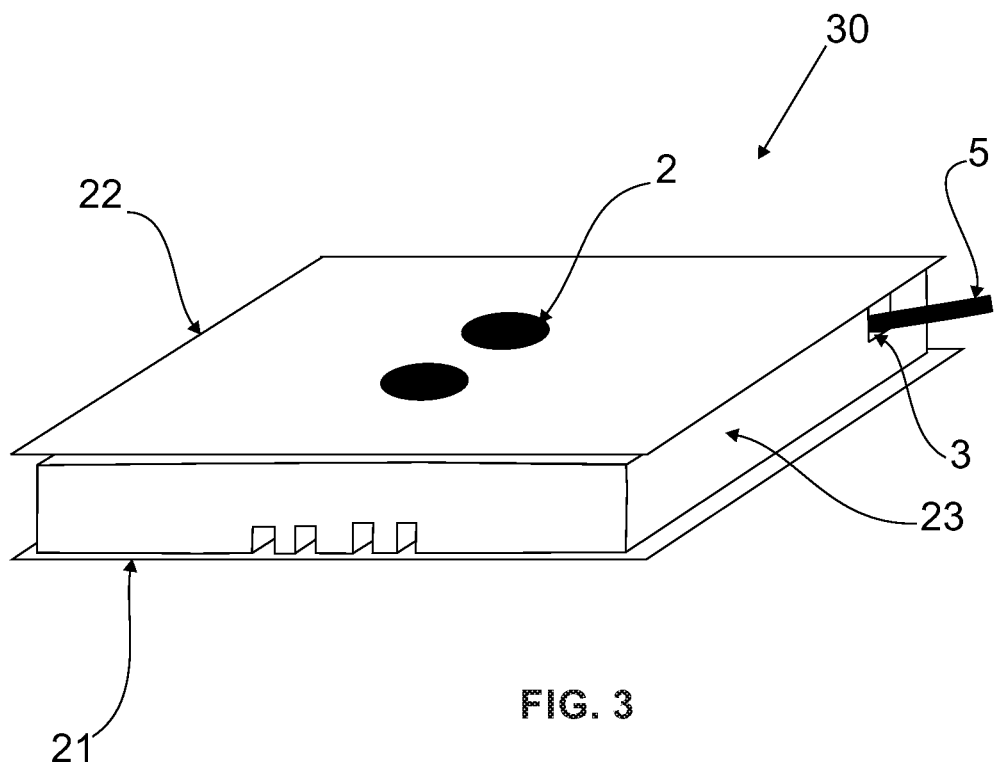
FIG. 3 is a schematic view in perspective of the internal irrigation circuit board arrayed in a plantable wall panel object of this invention.

According to a preferred embodiment as shown in FIGS. 1 to 3, the present invention refers to an internal irrigation circuit board 10, a plantable roof tile 20 comprising the internal irrigation circuit board 10 with a core 23 and to a plantable wall panel 30 comprising the internal irrigation circuit board 10 as a core 33.

As may be seen in FIGS. 1a and 1b, the internal irrigation circuit board 10 comprises a body 1 that may be solid or hollow, which does not accumulate water at undesirable places, restricting the weight limit of the board 10.

Particularly with regard to FIG. 1a, this illustrates an internal irrigation circuit board 10 with the specific geometry (trapezoidal, corrugated or other formats) whereby it forms at least one and preferably two spacer segments 13, 14 on each side of a growing surface 11 that contains a planting niche 2, conferring the structural characteristics of the tile formats commonly found on the market.

The planting niche 2 holds a substrate and a plurality of plant seedlings and it is in this planting niche 2 that the roots of these plants grow whereby they form a green roof tile together with a plurality of other plants grown in the planting niches 2 of other boards 10.

With regard to the spacer segments 13, 14, their function is to establish sufficient space, together with the other parts of the body 1, between a cap 22 of the plantable roof tile 20 (FIG. 2) and the growing surface 11 for the formation of a plant root system. Wider spacing between the cap 22 and the base 21, that is, a thicker core 23, allow larger plants to grow. The smaller the spacing, the smaller the volume for root formation in the planting niche 2, thus allowing only the growth of smaller plants.

As may also be seen in FIG. 1a, the body 1 of the internal irrigation circuit board 10 also comprises a drip irrigation channel 3 arrayed close to a rear extremity 15 of the board 10 and alongside the planting niche 2. This drip irrigation channel runs through the body 1, that is, from one lateral surface to the other, with its function being to hold at least one drip irrigation hose 5.

Furthermore, the drip irrigation channel 3 is cooperated with the planting niche 2 through the connecting channel 4 arrayed concurrently with the drip irrigation channel 3 and linking this drip irrigation channel 3 to the planting niche 2. The connecting channel 4 conveys water from the drip irrigation channel 3 to the planting niche 2 by gravity. Surplus water in the planting niche 2 is drained away through a plurality of run-off channels 6 that are longitudinally parallel to each other and connected to the planting niche 2, arrayed on a lower surface 12 of the body 1.

FIG. 1b illustrates a variation on the body 1 of the internal irrigation circuit board 10. In this variation, the body 1 presents a flat geometry with no spacer segments, but with channels at various levels preventing water from accumulating at undesired places.

In this variation of the internal irrigation circuit board 10 illustrated in FIG. 1b, the body 1 of the internal irrigation circuit board 10 also comprises a drip irrigation channel 3 arrayed close to a rear extremity 15 of the board 10 and alongside the planting niche 2. This irrigation channel runs across the body 1, that is, from one lateral surface to the other, with the function of holding at least one drip irrigation hose 5.

This drip irrigation channel 3 is cooperated with the planting niche 2 through the connecting channel 4 arrayed concurrently with the drip irrigation channel 3 and connecting this drip irrigation channel 3 to the planting niche 2. The connecting channel 4 conveys water from the drip irrigation channel 3 to the planting niche 2 by gravity. Surplus water in the planting niche 2 is drained away through a plurality of run-off channels 6 that are longitudinally parallel to each other and connected to the planting niche 2, arrayed on a lower surface 12 of the body 1.

This variation of the internal irrigation circuit board 10 illustrated in FIG. 1b allows its use on wall panels that are arranged vertically on indoor and outdoor walls, for example.

Still with regard to the body 1, this may consist of a single part, it may be a type of tray molded from a thin metal sheet, among other possibilities. However, for all options, the material used is preferably polymer or thermoplastic.

The internal irrigation circuit board 10 has the function of a core 23 in plantable roof tiles 20 and wall panels 30, holding a drip irrigation hose 5 that is inserted into the drip irrigation channel 3 only after the board 10 is assembled in the plantable roof tile 20 or wall panel 30.

More specifically and as may be seen in FIG. 2, the plantable roof tile 20 comprises the base tile 21 and a perforated cap tile 22 covering the base 21 in order to form a space that is filled by the core 23 which consists of the internal irrigation circuit board 10. The base tile 21 and the perforated cap tile 22 may be made from metal, polymer or thermoplastic material.

Similarly and as illustrated in FIG. 3, the wall panel 30 also comprises a base panel 21 and a perforated cap panel 22 covering the base 21 in order to form a space that is filled by the core 23 which consists of the internal irrigation circuit board 10. The base panel 21 and the perforated cap panel 22 may be made from metal, polymer or thermoplastic material.

For both the roof tile 20 and the wall panel 30, the perforated cap tile 22 ou perforated cap panel 22 comprises at least one hole facing the planting niche 2 of the internal irrigation circuit board 10 holding a plurality of plant seedlings.

Figure 4:
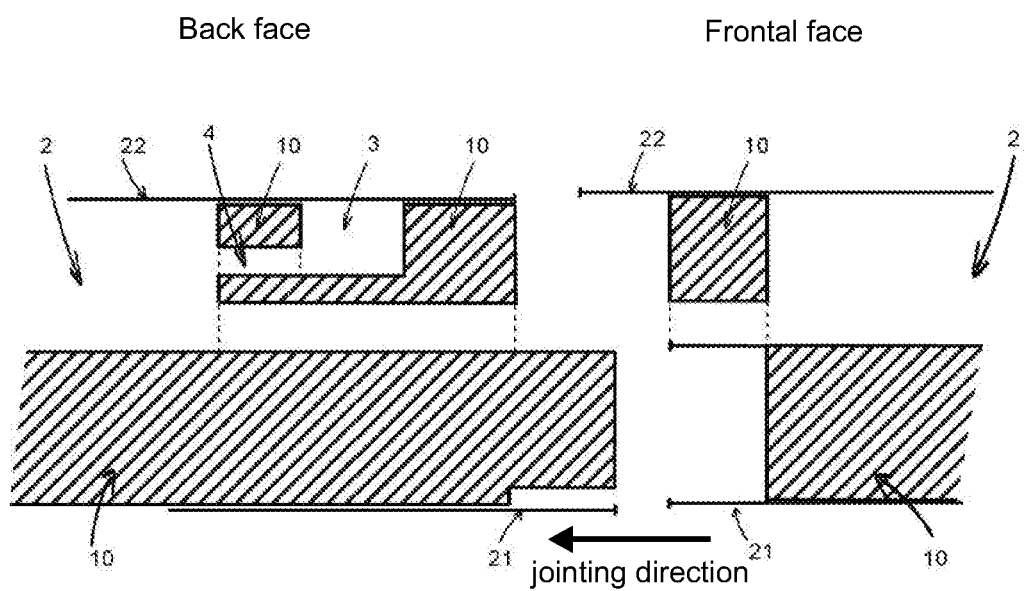
FIG. 4 is a schematic view of the drawer-like engagement of one plantable roof tile 20 in another succeeding plantable roof tile 20 or one wall panel 30 in another subsequent wall panel 30.

As illustrated in FIG. 4, as the plantable roof tile unit 20 or the wall panel 30 is assembled with the base tile 21/base panel 21, with a perforated cap tile 22/perforated cap panel 22 and the core 23 that consists of the internal irrigation circuit board 10, the joint of a plantable roof tile 20 to another subsequent roof tile 20 or a panel 30 to another subsequent panel 30 may done with a slot-in type system, aligning the connection points between the roof tiles 20 or the panels 30 where the conformation shown in the drawings forms a male and female type track that allows two parts to slide while remaining aligned and ensuring that they are leakproof, or with click-type or locking, also using a male and female configuration for the roof tile 20 or the panel 30, whereby they slot together along the upper line of a roof tile 20 or a panel 30 and the lower line of another roof tile 20 or panel 30 adjacent thereto during assembly.

Thus, once the plantable roof tiles 20 or the wall panels 30 are assembled, the drip irrigation hose 5 is inserted in the drip irrigation channels 3. Water running through the drip irrigation hose 5 is released into the drip irrigation channel 3 and conveyed by gravity to the planting niche 2 through the connecting channel 4, irrigating the substrate and the seedlings planted in the niche 2.

The geometry of the internal irrigation circuit board 10 addressed by this invention and the assembly of the plantable roof tile 20 or the wall panel 30 containing this internal irrigation circuit board 10 and also object of this invention, allow the use of any type of drip-irrigation hose, that is, the assembly of the plantable tile 20 or the wall panel 30 with this board 10 does not require a specific hose that must be considered a part of the roof tile 20. The user may select its best option for the drip irrigation hose after the roof tiles 20 have been installed.

This is because, after the roof tiles 20 or the panels 30 have been assembled/slotted together, the drip irrigation hose 5 is inserted in the drip irrigation channels 3 of these roof tiles 20 or panels 30 through a pusher or puller, similar to those used for electric wires, with this drip irrigation hose 5 requiring only a diameter compatible with the drip irrigation channel 3. Once the water begins to drip at any point along this drip irrigation channel 3, it is distributed by gravity to the planting niches 2 holding the substrate and the plant seedlings.

Having described in example of a preferred embodiment, it must be understood that the scope of this invention encompasses other possible variations, being limited only by the content of the appended Claims, including possible equivalents thereto.

The invention claimed is:

1. A pair of plantable roof tiles, each comprising, from bottom to top, a base tile, a core, and a perforated cap tile,
    wherein the core consists of an internal irrigation circuit board which comprises:
        a body comprising a growth surface opposite a lower surface, wherein the growth surface is closer to the top than the lower surface,
        a planting niche adjacent to a drip irrigation channel holding at least one drip irrigation hose, wherein the plant niche and the drip irrigation channel are open on the growth surface,
        the drip irrigation channel being cooperated with the planting niche through a connecting channel arrayed concurrently with the drip irrigation channel, wherein the connecting channel is open on the growth surface,
        the connecting channel being configured to convey water accumulated in the drip irrigation channel to the planting niche by gravity from the top;
        two or more longitudinal run-off channels connected to the planting niche, wherein surplus water in the planting niche is drained away through the two or more longitudinal run-off channels, wherein the two or more longitudinal run-off channels are longitudinally parallel to each other, and wherein the two or more longitudinal run-off channels are arrayed and open on the lower surface;
    wherein the base tile covers the lower surface of the core;
    wherein the perforated cap tile covers the core, wherein the perforated cap tile is open over the planting niche to allow seedlings in the plant niche to grow;
    wherein the first of the pair of plantable roof tiles has a female connector and the second of the pair of plantable roof tiles has a male connector, and
    wherein the female and male connectors are configured to connect such that the pair of plantable roof tiles are leakproof.

2. The plantable roof tile, according to claim 1, wherein the drip irrigation hose is configured to be inserted into the drip irrigation channel after the assembly of the internal irrigation circuit board in the space between the base tile and the perforated cap tile.

3. The plantable roof tile, according to claim 2, wherein the body comprises at least one spacer segments alongside the growing surface.

4. The plantable roof tile, according to claim 2, wherein the body is flat.

5. The plantable roof tile, according to claim 2, wherein the planting niche holds a substrate and a plurality of plant seedlings.

6. The plantable roof tile, according to claim 2, wherein the body is made from polymer or thermoplastic material and wherein the body is solid or hollow.

* * * * *